United States Patent
Choi et al.

(10) Patent No.: US 9,255,551 B2
(45) Date of Patent: Feb. 9, 2016

(54) DIESEL-GASOLINE DUAL FUEL POWERED ENGINE WITH FOULING FREE CLEAN EGR SYSTEM

(71) Applicant: Hyundai Motor Company, Seoul (KR)

(72) Inventors: Dae Choi, Hwaseong-si (KR); Minyoung Ki, Seoul (KR); Seungil Park, Hwaseong-si (KR); Hyeungwoo Lee, Suwon-si (KR); Yohan Chi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 458 days.

(21) Appl. No.: 13/713,570

(22) Filed: Dec. 13, 2012

(65) Prior Publication Data
US 2013/0152909 A1    Jun. 20, 2013

(30) Foreign Application Priority Data
Dec. 15, 2011    (KR) .................. 10-2011-0135577

(51) Int. Cl.
| | |
|---|---|
| *F02B 47/08* | (2006.01) |
| *F02M 25/07* | (2006.01) |
| *F02D 41/30* | (2006.01) |
| *F02B 7/02* | (2006.01) |

(Continued)

(52) U.S. Cl.
CPC .............. *F02M 25/0726* (2013.01); *F02B 7/02* (2013.01); *F02B 47/08* (2013.01); *F02D 19/0649* (2013.01); *F02D 41/0065* (2013.01); *F02D 41/3047* (2013.01); *F02M 25/0749* (2013.01); *F02D 41/0025* (2013.01); *Y02T 10/36* (2013.01); *Y02T 10/47* (2013.01)

(58) Field of Classification Search
CPC ........... F02M 25/0726; F02M 25/0749; F02B 47/08; F02D 41/0065

USPC ............. 123/568.12, 568.17–568.19, 568.21, 123/559.1; 60/605.2
See application file for complete search history.

(56) References Cited

U.S. PATENT DOCUMENTS

| | | | | |
|---|---|---|---|---|
| 4,131,095 | A | * | 12/1978 | Ouchi .......................... 123/58.8 |
| 5,562,085 | A | * | 10/1996 | Kosuda et al. ........... 123/568.24 |

(Continued)

FOREIGN PATENT DOCUMENTS

| | | |
|---|---|---|
| DE | 43 31 509 C1 | 9/1993 |
| EP | 0 686 759 A1 | 6/1995 |

(Continued)

OTHER PUBLICATIONS

Search Report dated May 13, 2013, in European Patent Application No. 12196948.9.

*Primary Examiner* — Hai Huynh
(74) *Attorney, Agent, or Firm* — Morgan, Lewis & Bockius LLP

(57) ABSTRACT

A fouling free clean EGR system for a diesel-gasoline dual fuel powered engine allows re-circulation of an exhaust gas of a certain cylinder among a plurality of cylinders. The fouling free clean exhaust gas recirculation (EGR) system for a diesel-gasoline dual fuel powered engine in which gasoline and air are pre-mixed and supplied to cylinders and then a diesel fuel is injected and combusted together comprises a directly-exhaust cylinder of which an exhaust valve of the cylinder is connected to an exhaust manifold directly connected to a after treatment device; and an EGR cylinder of which an exhaust valve of the cylinder is connected to an EGR line and which supplies the EGR gas to the diesel-gasoline dual fuel powered engine.

4 Claims, 1 Drawing Sheet

(51) Int. Cl.
*F02D 19/06* (2006.01)
*F02D 41/00* (2006.01)

(56) References Cited

U.S. PATENT DOCUMENTS

| | | | |
|---|---|---|---|
| 6,543,230 | B1 | 4/2003 | Schmid |
| 6,877,492 | B1* | 4/2005 | Osterwald ............... 123/568.11 |
| 7,121,254 | B2* | 10/2006 | Wickman et al. ............ 123/304 |
| 7,281,531 | B1* | 10/2007 | Fulton et al. ............ 123/568.17 |
| 8,528,530 | B2* | 9/2013 | Freund et al. .............. 123/568.2 |
| 8,915,081 | B2* | 12/2014 | Hayman et al. ............. 60/605.2 |
| 8,931,462 | B2* | 1/2015 | Pappenheimer ......... 123/568.18 |
| 8,944,034 | B2* | 2/2015 | Gingrich et al. ........ 123/568.11 |
| 8,977,474 | B2* | 3/2015 | Choi et al. .................... 701/108 |
| 2009/0308070 | A1 | 12/2009 | Alger, II et al. |
| 2010/0024417 | A1 | 2/2010 | Pierpont et al. |
| 2011/0100323 | A1 | 5/2011 | Bradley et al. |
| 2012/0159947 | A1* | 6/2012 | Andersson et al. ............. 60/600 |
| 2013/0087123 | A1 | 4/2013 | Ki et al. |
| 2013/0255251 | A1* | 10/2013 | Tanaka et al. ................ 60/605.2 |
| 2014/0083096 | A1* | 3/2014 | Andersson et al. .......... 60/605.2 |
| 2014/0251285 | A1* | 9/2014 | Surnilla et al. ................ 123/520 |
| 2014/0260193 | A1* | 9/2014 | Moravec et al. ................ 60/274 |

FOREIGN PATENT DOCUMENTS

| | | | |
|---|---|---|---|
| EP | 1053396 B1 | 8/2005 | |
| JP | 62-041940 A | 2/1987 | |
| JP | 2009-287434 A | 12/2009 | |
| JP | 2011-214552 A | 10/2011 | |
| WO | WO 2010/095983 | * 8/2010 | ............. F02B 37/22 |

* cited by examiner

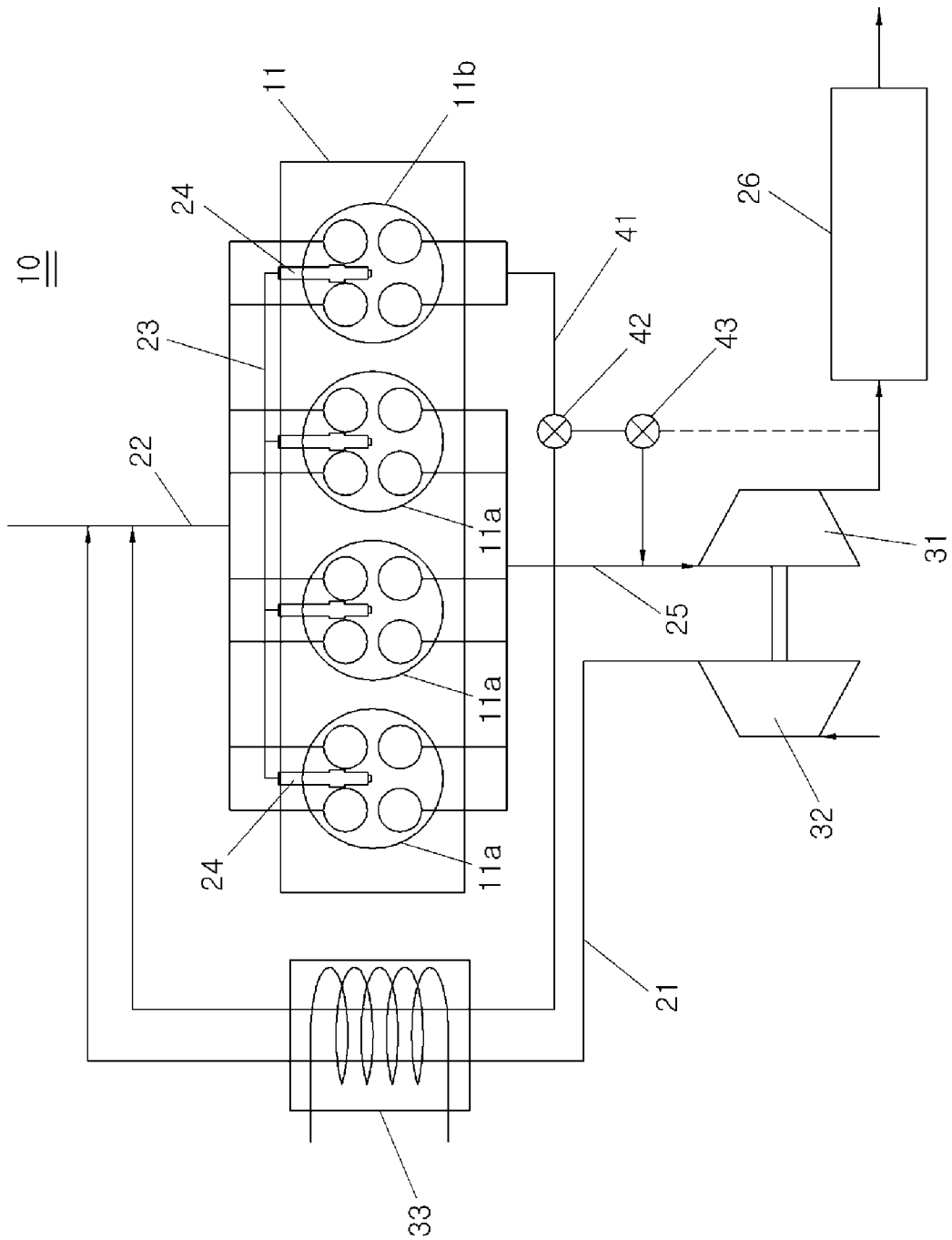

DIESEL-GASOLINE DUAL FUEL POWERED ENGINE WITH FOULING FREE CLEAN EGR SYSTEM

CROSS-REFERENCE TO RELATED APPLICATIONS

The present application claims priority of Korean Patent Application Number 10-2011-0135577 filed Dec. 15, 2011, the entire contents of which application is incorporated herein for all purposes by this reference.

BACKGROUND OF INVENTION

1. Field of Invention

The present invention relates to a clean exhaust gas recirculation (EGR) system for a diesel-gasoline dual fuel powered engine and a diesel-gasoline dual fuel powered engine adapting the same, and in particular to a clean EGR system for a diesel-gasoline dual fuel powered engine and a diesel-gasoline dual fuel powered engine adapting the same which make it possible to re-circulate an exhaust gas of a cylinder among a plurality of cylinders, and the exhaust gas from the remaining cylinders are directly exhausted.

2. Description of Related Art

The exhaust gas recirculation (EGR) system is widely installed in vehicles so as to reduce NOx in such a way that an exhaust gas from an engine is re-circulated and introduced into the interior of the cylinder. The above-mentioned EGR system is provided so as to meet the exhaust gas regulations of the engine.

The EGR system adapted to a diesel fuel engine will be described. Since an exhaust gas is re-circulated and introduced into the cylinder, a problem occurs at the EGR system owing to a particle matter (PM) including a soluble organic fraction (SOF) and soot. Such a problem causes the performance, fuel efficiency and exhaust characteristics to worsen.

In addition, as one of the ways to effectively cope with the reinforced regulations and high fuel efficiency demands, it is recommended that the advantages of a diesel fuel engine and a gasoline fuel engine are taken and combined.

As one of the specific ways, there is a diesel-gasoline dual fuel powered combustion engine in which gasoline and air are pre-mixed and supplied to cylinders and then a diesel fuel is injected and combusted together is capable of reducing NOx and realizing high fuel mileage being equal to that of diesel engine.

However, as to the diesel-gasoline dual fuel powered combustion engine provided with EGR system, a fouling cannot be reduced efficiently The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention attempts to resolve the problems encountered in the conventional art. Various aspects of the present invention provide for a fouling free clean EGR system for a diesel-gasoline dual fuel powered engine and a diesel-gasoline dual fuel powered engine adapting the same in which an EGR system is made by an exhaust gas from a cylinder among a plurality of cylinder after generating driving force, and the exhaust gas from the remaining cylinders is directly exhausted after generating driving force, for the purpose of preventing fouling in the EGR system.

Various aspects of the present invention provide for a fouling free clean exhaust gas recirculation (EGR) system for a diesel-gasoline dual fuel powered engine in which gasoline and air are pre-mixed and supplied to cylinders and then a diesel fuel is injected and combusted together, comprising a directly-exhaust cylinder of which an exhaust valve of the cylinder is connected to an exhaust manifold directly connected to a after treatment device; and an EGR cylinder of which an exhaust valve of the cylinder is connected to an EGR line and which supplies the EGR gas to the diesel-gasoline dual fuel powered engine.

The EGR line may pass through a cooler provided at the downstream of a compressor of a turbo charger on an air intake line.

At the upstream of the cooler on the EGR line may be provided a first bypass valve controlling the EGR gas from the EGR cylinder to be transferred to the cooler or the after treatment device.

Between the first bypass valve and the after treatment device may be provided a second bypass valve controlling the exhaust gas, which has passed through the first bypass valve, to be transferred to the turbine of the turbo charger or the after treatment device.

Various aspects of the present invention provide for a diesel-gasoline dual fuel powered engine to which is adapted a fouling free clean EGR system of a diesel-gasoline dual fuel powered engine in which gasoline and air are pre-mixed and supplied to cylinders and then a diesel fuel is injected and combusted together, comprising a directly-exhaust cylinder of which an exhaust valve of the cylinder is connected to an exhaust manifold directly connected to a after treatment device; and an EGR cylinder of which an exhaust valve of the cylinder is connected to an EGR line and which supplies the EGR gas to the diesel-gasoline dual fuel powered engine, and the EGR line is connected to the EGR cylinder after it passes through a cooler provided at the downstream of a compressor of a turbo charger on an air intake line.

According to the fouling free clean EGR system for a diesel-gasoline dual fuel powered engine and a diesel-gasoline dual fuel powered engine adapting the same feature in that a certain cylinder among a plurality of cylinders belonging to a diesel-gasoline dual fuel powered engine is set as a cylinder which handles an EGR gas. The clean exhaust gas produced thanks to the fuel-mixed combustion is use as an EGR gas, so particle matters (PM) contained in the EGR gas are prevented from fouling on the inner sides of the EGR system.

Since the particle matters are prevented from sticking on the inner sides of the EGR system, the EGR system can operate smooth, and the inhibitions of NOx, which are the basic functions of the EGR system, are not interfered.

Further, pumping loss of the turbo charger for compensating a flux of the EGR gas caused by the fouling is minimized, so fuel efficiency is improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a block diagram illustrating an exemplary fouling free clean EGR system for a diesel-gasoline dual fuel powered engine according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The fouling free clean EGR system for a diesel-gasoline dual fuel powered engine according to the present invention will be described with reference to the accompanying drawings.

The fouling free clean EGR system for a diesel-gasoline dual fuel powered engine according to the present invention features in that a certain cylinder 11b among a plurality of cylinders 11a and 11b belonging to a diesel-gasoline dual fuel powered engine is set as a cylinder which serves for the sake of an EGR gas. The remaining cylinders 11a are set to directly exhaust the gas after the explosion stroke.

In the diesel-gasoline dual fuel powered engine 10 formed of a plurality of cylinders 11a and 11b, the cylinders 11a and 11b are divided into an EGR cylinder 11b supplying the EGR and a directly-exhaust cylinder 11a not supplying it. The exhaust gas from the EGR cylinder 11b is re-circulated for the sake of the EGR, and the exhaust gas from the directly-exhaust cylinder 11a is directly exhausted.

The EGR cylinder 11b has an exhaust valve connected to the EGR line. The EGR line 41 connects the EGR cylinder 11b and an air intake manifold 22, so the exhaust gas from the EGR cylinder 11b is re-circulated.

The directly-exhaust cylinder 11a is formed of almost cylinders except for the EGR cylinder 11b, and the directly-exhaust cylinder 11a serves to directly exhaust the gas without re-circulating the gas by way of the exhaust manifold 25.

Since the EGR is directed to re-circulating part of the gas, not all the exhaust gas, almost cylinders among the cylinders 11a and 11b become the directly-exhaust cylinders 11a, a specific cylinder becomes the EGR cylinder 11b. For example, as shown in FIG. 1, if the engine is formed of a 4-cylinder diesel-gasoline dual fuel powered engine 10, three cylinders become the directly-exhaust cylinders 11a, and one cylinder can be set as the EGR cylinder 11b. If the number of the cylinders of the diesel-gasoline dual fuel powered engine 10 increases, the cylinders might be divided into the EGR cylinders 11b and the directly-exhaust cylinders 11a at a certain ratio, so the EGR cylinder 11b can supply the re-circulating EGR gas solely.

The EGR cylinder 11b and the directly-exhaust cylinder 11a have the same air intaking system and the same fuel supply system. A gasoline fuel is injected into an externally supplied air, and the premixed gasoline fuel and air are introduced into the EGR cylinder 11b and the directly-exhaust cylinder 11a. The diesel fuel injector 24 is provided at both the EGR cylinder 11b and the directly-exhaust cylinder 11a, so a diesel fuel is injected into the fuel-premixed and compressed air.

The exhaust system is divided into the EGR cylinder 11b and the directly-exhaust cylinder 11a, and the exhaust gas from the EGR cylinder 11b is re-circulated toward the air intake manifold 22 by way of the EGR line 41, and at the rear end portion of the directly-exhaust cylinder 11a is provided the exhaust manifold 25. The exhaust system is connected from the exhaust manifold 25 to a aftertreatment device 26 by way of the exhaust line.

The EGR line 41 connects the EGR cylinder 11b and the air intake manifold 22, and the exhaust gas from the EGR cylinder 11b is re-circulated and supplied to each cylinder, in other words, the EGR cylinder 11b and the directly-exhaust cylinder 11a.

The exhaust manifold 25 is connected to the after treatment device 26 by way of the exhaust line, and at the upstream of the after treatment device 26 is provided a compressor 32 of the turbo charger.

The compressor 32 is connected with a turbine 31 provided at the air intake line 21, thus forming the turbo charger.

At this time, on the air intake line 21 is provided a cooler 33 for cooling the air which is heated as it is compressed by the compressor 32.

The EGR line 41 passes through a cooler connected from the EGR cylinder through the EGR line 41, and the EGR line 41 connected with the air intake line 21 supplying new air passing through compressor of the turbo charger. The EGR gas provided by the EGR line is supplied to all the cylinders 11a, 11b including the EGR cylinder 11b. The cooler 33 can be selected one or more within the EGR coolers and a intercoolers.

On the EGR line 41 is provided a first bypass valve 42. The first bypass valve 42 is provided between the EGR cylinder 11b and the cooler 33 on the EGR line, so the EGR gas from the EGR cylinder 11b could be re-circulated to the air intake manifold 22 by way of the cooler 33 or could be selectively supplied to the after treatment device 26. The dividing ratio of the exhaust gas can be adjusted. For example, at the initial engine start stage, the exhaust gas from the EGR cylinder 11b could be supplied to the after treatment device 26 by way of the first bypass valve 42 so as to activate and heat the after treatment device 26. In almost cases, it is controlled that the first bypass valve 42 re-circulates the exhaust gas and receives air.

In addition, the exhaust gas could be transferred to the cooler 33 and the after treatment device 26 so as to meet the EGR ratio that the ECU has set Between the first bypass valve 42 and the after treatment device 26 is provided a second bypass valve 43 for the purpose of selectively transferring the EGR gas, which was divided from the first bypass valve 42 to the after treatment device 26, to the turbine 31 or the sot-treatment device 26. The second bypass valve 43 is configured to transfer all the exhaust gas to one side or to divide it at a certain ratio and transfer it separately.

The diesel-gasoline dual fuel powered engine to which is adapted the fouling free clean EGR system for a diesel-gasoline dual fuel powered engine according to the present invention adapts the fouling free clean EGR system for the diesel-gasoline dual fuel powered engine.

The diesel-gasoline dual fuel powered engine to which is adapted the diesel-gasoline dual fuel powered engine according to the present invention comprises a plurality of cylinders. A diesel fuel and a gasoline fuel are mixed and combusted in each cylinder. A certain cylinder among a plurality of the cylinders is set to serve the EGR gas, and the exhaust gas from the remaining cylinders is directly exhausted for thereby driving the turbine of the turbo charger.

The directly-exhaust cylinder 11a is connected to the exhaust manifold of which the exhaust valve of the cylinder is directly connected to the after treatment device. The exhaust gas from the directly-exhaust cylinder 11a does not re-circulate, but is used to drive the turbine 31 of the turbo charger.

The EGR cylinder 11b is selected from the multiple cylinders. The exhaust gas from the EGR cylinder 11b is re-circulated in the directly-exhaust cylinder 11a and the EGR cylinder 11b by way of the EGR line 41. In other words, part of the exhaust gas from all the cylinders is re-circulated in the conventional engine; however the diesel-gasoline dual fuel powered engine to which is adapted the fouling free clean EGR system of the diesel-gasoline dual fuel powered engine according to the present invention features in that the exhaust gas from the EGR cylinder 11b serves the exhaust recirculation.

So, the EGR line 41 is connected with the EGR cylinder 11b and the air intake line 21, not connected with the exhaust manifold 25 exhausting the exhaust gas from the directly-exhaust cylinder 11a.

For convenience in explanation and accurate definition in the appended claims, the terms rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fouling free clean exhaust gas recirculation (EGR) system of a diesel-gasoline dual fuel powered engine in which gasoline and air are pre-mixed and supplied to cylinders and then a diesel fuel is injected and combusted together, comprising:
    a directly-exhaust cylinder including a first exhaust valve connected to an exhaust manifold directly connected to an after treatment device; and
    an EGR cylinder including a second exhaust valve connected to an EGR line and supplying an EGR gas from the EGR cylinder to the diesel-gasoline dual fuel powered engine;
    wherein the EGR line is connected with the EGR cylinder without being connected with the directly-exhaust cylinder,
    wherein a first bypass valve is provided on the EGR line between the EGR cylinder and the cooler, and
    wherein a second bypass valve is provided between the first bypass valve and the after treatment device to transfer the EGR gas, which has passed through the first bypass valve, to a turbine of the turbo charger or to the after treatment device.

2. The fouling free clean exhaust gas recirculation (EGR) system according to claim 1,
    wherein the EGR line passes from the EGR cylinder through a cooler and is connected with an air intake line supplying new air passing through a compressor of a turbo charger.

3. The fouling free clean exhaust gas recirculation (EGR) system according to claim 2,
    wherein the first bypass valve is provided on the EGR line between the EGR cylinder and the cooler to transfer the EGR gas from the EGR cylinder to the air intake line through the cooler or to the after treatment device.

4. A diesel-gasoline dual fuel powered engine in which gasoline and air are pre-mixed and supplied to cylinders and then a diesel fuel is injected and combusted together, comprising:
    a directly-exhaust cylinder including a first exhaust valve connected to an exhaust manifold connected to an after treatment device through a turbine of a turbo charger to directly exhaust a gas from the directly-exhaust cylinder to the turbine without re-circulating the gas to the diesel-gasoline dual fuel powered engine; and
    an EGR cylinder including a second exhaust valve connected to an EGR line to supply an EGR gas from the EGR cylinder to the diesel-gasoline dual fuel powered engine, and
    the EGR line passes from the EGR cylinder through a cooler, and is connected with an air intake line supplying new air passing through a compressor of the turbo charger,
    wherein the EGR line is connected with the EGR cylinder without being connected with the directly-exhaust cylinder,
    wherein a first bypass valve is provided on the EGR line between the EGR cylinder and the cooler, and
    wherein a second bypass valve is provided between the first bypass valve and the after treatment device to transfer the EGR gas, which has passed through the first bypass valve, to a turbine of the turbo charger or to the after treatment device.

* * * * *